(12) United States Patent
Lombardi

(10) Patent No.: US 6,601,306 B1
(45) Date of Patent: Aug. 5, 2003

(54) TOOL AND CONNECTION THEREFOR BETWEEN WORKING PORTION AND HANDLE PORTION THEREOF

(75) Inventor: Keith Lombardi, Farmington, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/636,023

(22) Filed: Aug. 11, 2000

(51) Int. Cl.$^7$ ................................................ B23D 51/01
(52) U.S. Cl. ........................... 30/517; 30/340; 16/110.1
(58) Field of Search .......................... 30/340, 342, 343, 30/517; 16/110.1, 431; 91/177.8

(56) References Cited

U.S. PATENT DOCUMENTS 5,448,833 A * 9/1995 Coon ........................ 30/517 X

FOREIGN PATENT DOCUMENTS

DE 476128 4/1929

* cited by examiner

*Primary Examiner*—Douglas D. Watts
(74) *Attorney, Agent, or Firm*—Pillsbury Winthrop LLP

(57) ABSTRACT

A cutting device includes a cutting blade formed of metal and having a forwardly disposed toothed portion and a rearwardly disposed tapered shank portion being tapered in shape and having outwardly extending projections, and a handle portion formed of plastic and provided with a slot defined therein for accommodating the tapered shank portion of the cutting blade. The slot is formed such that as the shank portion is pressed into the slot, the projections displace a portion of the plastic material forming the handle portion to fixedly secured the cutting blade within the handle portion. The cutting blade may be formed with a hole disposed at a predetermined distance from a rearward end portion of the shank portion to facilitate assembly and inspection purposes. A method for assembling the cutting device includes inserting a fixing element into the hole formed in the cutting blade to hold the cutting blade fixed, and pressing the cutting blade into the slot in the handle portion to a predetermined depth such that a rearward-most tooth of the toothed portion of the cutting blade is at least partially in an enlarged opening of the slot.

37 Claims, 6 Drawing Sheets

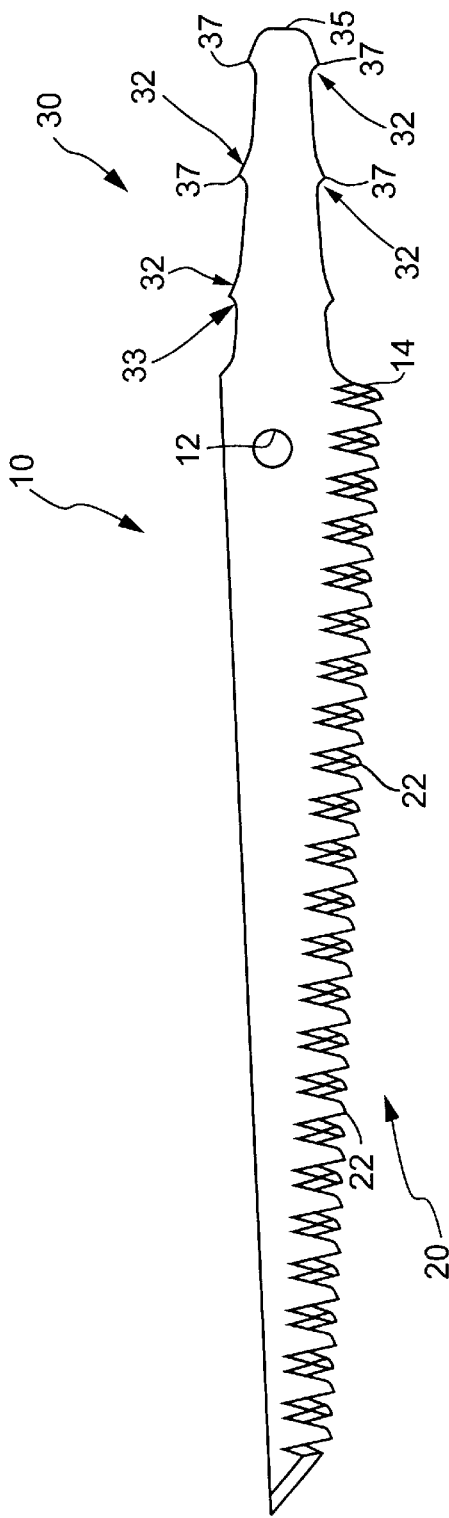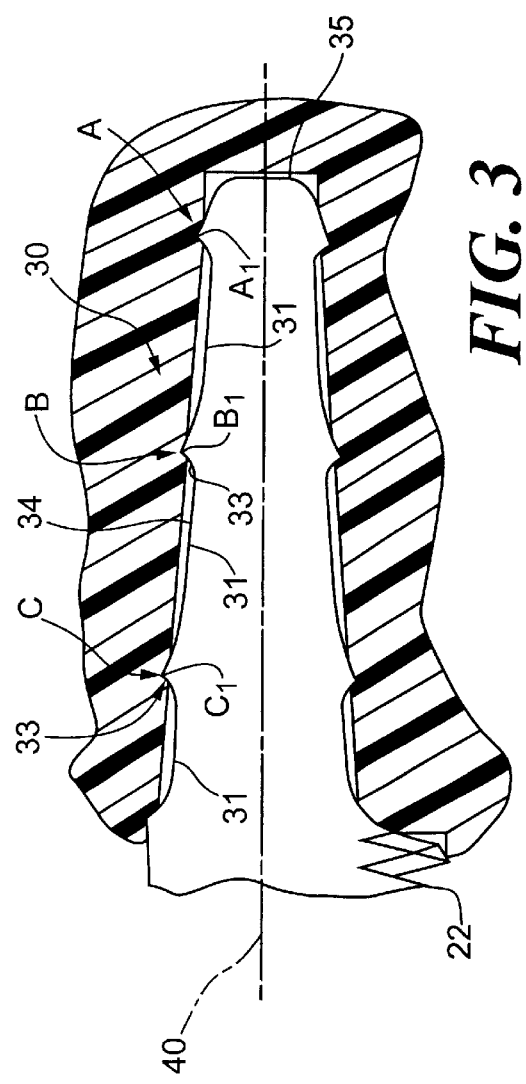

TOOL AND CONNECTION THEREFOR BETWEEN WORKING PORTION AND HANDLE PORTION THEREOF

FIELD OF THE INVENTION

The present invention is directed to a handle design which permits an instrument such as cutting blade to be securely attached to a handle. More particularly, the present invention is directed to a handle for a saw which remains securely held to a cutting blade under high tensile loads in a cost effective and efficient manner.

BACKGROUND OF THE INVENTION

An important factor contributing to the pull-out strength of a saw is the method of attachment of the handle to the cutting blade. Material considerations also play a role. Past attempts to improve handle designs have included first positioning a blade shank within a hollowed wooden handle, and then pouring metal into the handle to bind the shank to the wood. Other attempts have included inserting the blade shank into heated rubber and then letting the rubber cool and harden around the shank. Still others have used nuts or rivets to secure the shank to the handle. These methods, however, are not very efficient or cost effective.

Thus, there is a widely recognized need, and it would be advantageous to have, a more cost efficient and effective blade shank and handle attachment construction. Additional advantages of the present invention are described with respect to its specific embodiments discussed below.

SUMMARY OF THE INVENTION

To address shortcomings of the conventional designs, the present invention provides a new and improved blade shank and handle construction which reliably secures a cutting blade to a handle, e.g. a saw handle, in a cost effective and convenient manner.

According to further features of the present invention, there is provided a cutting blade and handle construction which requires a small amount of force to secure the cutting blade to the handle and a large force to separate.

According to still another aspect of the present invention, there is provided a device for cutting which is easy to assemble.

According to still further features of the present invention, there is provided a cutting device having a construction which enhances the appearance of the device.

In accordance with one aspect of the present invention, a device for cutting includes a cutting blade made of metal which has a forwardly disposed toothed portion and a rearwardly disposed shank portion terminating in a rearward end surface. The shank portion has a tapered shape and has outwardly extending projections terminating at associated end portions. The projections are spaced along a longitudinal axis of the cutting blade, and the associated end portions have increasing distances from the longitudinal axis as the associated projections are disposed further away from the end surface of the shank portion. The cutting device also includes a handle portion made of plastic material which has a tapered slot defined therein for accommodating the shank portion of the cutting blade such that the projections are fixedly secured within the handle portion.

In accordance with another aspect of the present invention, a device for cutting includes a cutting blade made of metal which has a forwardly disposed toothed portion and a rearwardly disposed tapered shank portion in a terminating in a rearward end surface. A hole is formed in the cutting blade portion. The cutting device also includes a handle portion made of plastic material and provided with a slot defined therein for accommodating the tapered shank portion of the cutting blade to a predetermined depth therein, such that the hole remains forwardly disposed from the handle portion.

In accordance with still another aspect of the present invention, a device for cutting includes a cutting blade made of metal and having a forwardly disposed toothed portion and a rearwardly disposed tapered shank portion. The cutting device also includes a handle portion made of plastic material and provided with a slot defined therein for accommodating the tapered shank portion of the cutting blade, such that the cutting blade can be attached to the handle portion. The handle portion also has a forwardly facing surface surrounding the slot. The slot has an enlarged forward opening, and is configured and positioned to accommodate the toothed portion of the cutting blade, such that at least a portion of a rearward-most tooth is disposed in the enlarged forward opening and rearwardly of the forwardly facing surface.

In still another aspect of the present invention, a method of manufacturing a cutting device includes providing a metal cutting blade having a forwardly disposed toothed portion and a rearwardly disposed shank portion having a plurality of outwardly extending projections. The method further includes providing a plastic handle portion having a slot defined therein, and effecting relative movement of the shank portion of the cutting blade into the slot defined in the handle portion, each of said projections displacing a particular associated portion of plastic material lining said slot, which portion of plastic material is not displaced by another of said projections.

In still a further aspect of the present invention, a method of assembling a device for cutting includes holding a cutting blade with a fixing element inserted through a hole formed in the cutting blade, and securing the cutting blade to a plastic handle portion by pressing a tapered shank portion of the cutting blade to a predetermined depth into a slot formed in the handle portion so as to be fixedly secured therein, the tapered shank portion having outwardly extending projections terminating at associated end portions.

The present invention successfully addresses shortcomings of known cutting blade and handle configurations. Other objects and advantages of the present invention will become apparent from the following claims and detailed description.

BRIEF DESCRIPTION OF THE DRAWINGS

Reference will be made hereinafter to the accompanying drawings, wherein:

FIG. 2 is side elevational view of a cutting blade shown in FIG. 1;

FIG. 3 is an enlarged view of a shank portion of the cutting blade shown in FIG. 1 and shown in relation to a break-away cross section of the handle portion;

DETAILED DESCRIPTION OF THE INVENTION

Figure 1:
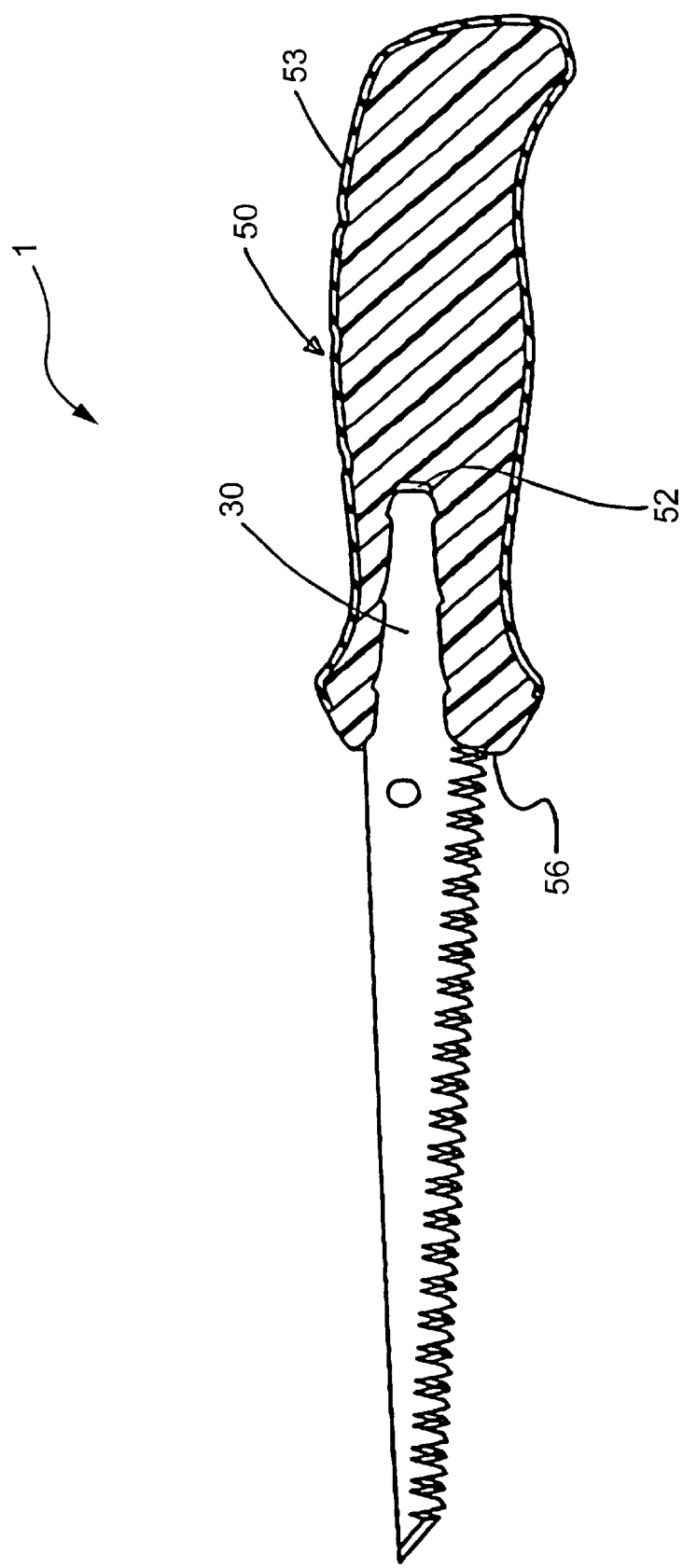
FIG. 1 is a sectional view according to an embodiment of the present invention taken along lines 1—1 in FIG. 5.

As shown in FIG. 1, an aggressive tooth jab saw according to the present invention is generally designated at 1. As shown in FIGS. 1–6, the saw includes a metal cutting blade 10 and a plastic handle 50. The cutting blade 10 includes a forwardly disposed toothed portion 20 having a series of teeth 22 and a rearwardly disposed tapered tang or shank portion 30 terminating in a rearward end surface 35. The cutting blade 20 is formed of high carbon steel or other suitable metal material. The handle 50 is formed at least from polypropylene and may or may not include a thermoplastic (TPR) cover 53. Although the handle 50 is specified to be polypropylene with or without a surrounding TPR cover portion 53, one skilled in the art will readily recognize that the handle 50 may also be formed from other suitable plastic materials.

In one illustrated embodiment of the present invention as shown in FIGS. 1–6, the shank portion 30 has a narrowing shape as it approaches end surface 35, and is provided with barbs or projections 32. Preferably, the shank portion 30 is tapered so that when the shank portion 30 is pressed into the handle portion 50, the projections 32 along the shank portion 30 displace new plastic only, as will be discussed in further detail below. The projections 32 terminate in associated end portions 37, which are preferably pointed. The length of the shank portion 30 may vary. However, a length of approximately 2 inches has been found to be effective.

As previously mentioned, the shank portion 30 is tapered. The taper of the shank portion 30 is directly related to the height and spacing of the projections 32. The height of the projections 32 is determined with respect to a distance from a longitudinal axis 40 of the cutting blade 10, and the spacing of the projections 32 is determined with respect to a spacing along the longitudinal axis 40. The projections 32 may be evenly spaced along the shank portion 30, and pairs of projections are on opposite sides of the longitudinal axis as opposed to being offset. However, one skilled in the art will readily recognize that other spacings may also be used.

The size and number of the projections 32 facilitate obtaining a high pull-out force, i.e. a high tensile load, before the cutting blade 10 disengages from the handle portion 50. After testing several different configurations, it has been determined that smaller projections and more of them is more effective than few numbers of larger projections.

In the illustrated embodiment shown in FIGS. 1–4, there are six projections 32 disposed about the shank portion 30 arranged in three pairs. One skilled in the art will readily recognize that the number of projections 32 disposed about the shank potion 30 may vary.

Figure 10:
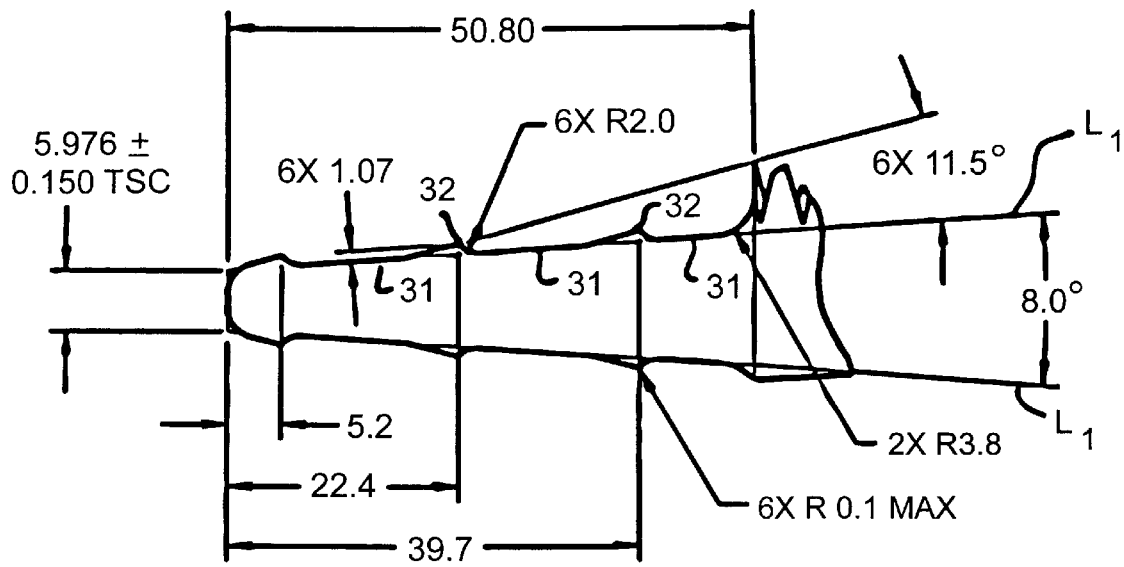
FIG. 10 is an enlarged view of the shank portion of the cutting blade shown in FIG. 2.

As shown in FIG. 10, the shank portion 30 of the first embodiment includes a plurality of base edges 31 from which the projections 32 project. The base edges are in alignment with one another, along a straight line, indicated at $L_1$. The projections 32 extend approximately 1.07±0.15 mm above that straight line $L_1$.

Figure 11:
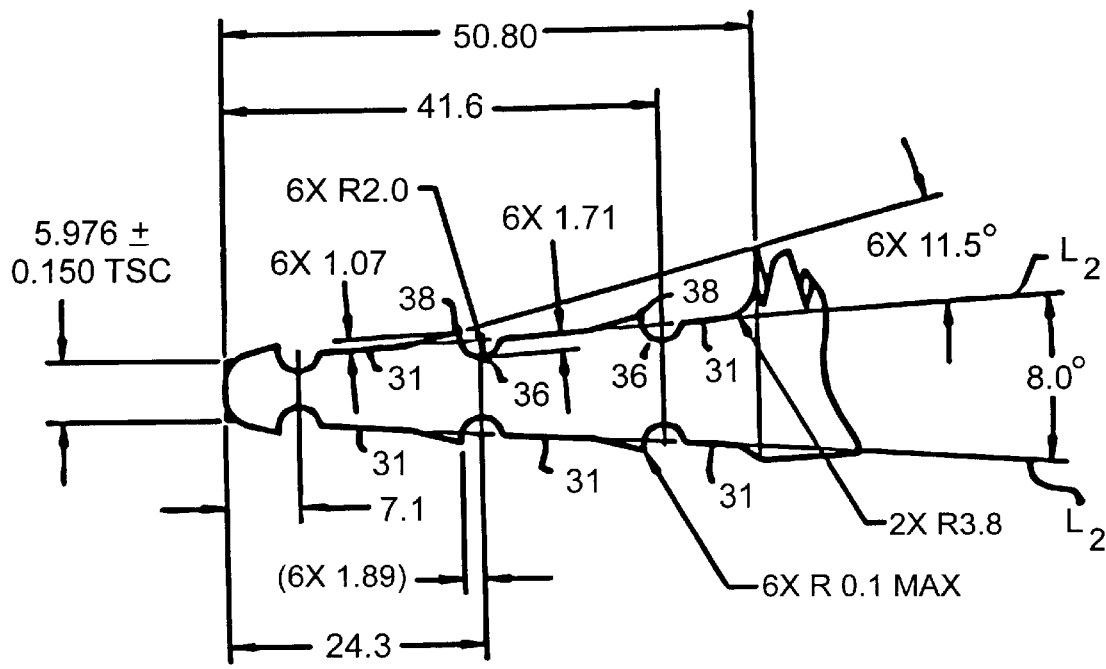
FIG. 11 is an enlarged view of the shank portion of the cutting blade shown in FIG. 7.

As shown in FIG. 11, illustrating another embodiment, again a plurality of co-linear base edges 31 are provided and define imaginary line $L_2$. Again here, the projections 38 project 1.07±0.15 mm from this line. In this embodiment, a semicircular recess 36 is provided immediately forwardly of each projection and extends below the line $L_2$. Each recess has a radius of about 2.0±0.4 mm and is constructed and arranged to receive displaced or deflected (but preferably not cut) plastic material lining the slot in the handle as the shank portion is pressed into the slot.

In both embodiments, it is preferred that the angle between the base edges on opposite sides of the blade (i.e., the angle between lines $L_1$ and the angle between lines $L_2$) be about 8.0°±1.0°. It is also preferred that the projections extend at an angle of about 11.5°±1.0° with respect to the line ($L_1$ or $L_2$) formed by the base edges 31.

Figure 9:
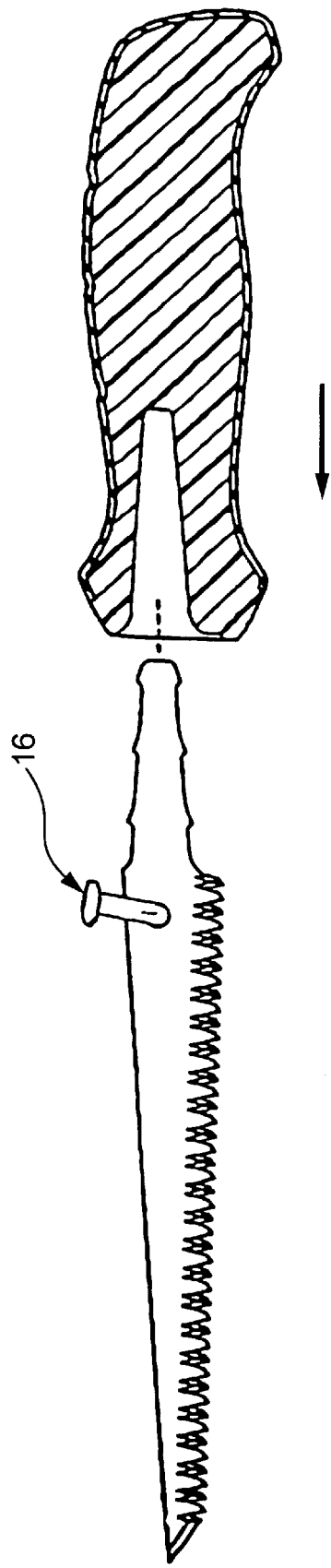
FIG. 9 is an illustration an attachment method of the cutting device shown in FIG. 4 in accordance with an embodiment of the present invention.

Formed in the cutting blade 10 is a hole 12. The hole is formed generally along the toothed portion 20 of the cutting blade 10 and remains forwardly of the forwardmost surface 56 of the handle portion 50 after the cutting blade 10 is assembled with the handle portion 50. The hole may have a diameter of approximately 3/16 inches, though the diameter of the hole is not limited to this size. The purpose of providing the hole 12 in the cutting blade 10 is primarily to assist in assembly of the saw. The hole 12 permits a fixing element 16 to be inserted into the hole 12, as shown in FIG. 9 to secure the cutting blade 10 during assembly. The fixing element 16 may a hardened steel pin, or another suitable fixing element. The hole 12 is also facilitates a quality control inspection. Since the hole 12 is formed at a predetermined distance form the rearward end surface 35 of the shank portion 30, the distance from the hole 12 to a forwardly facing surface 56 of the handle portion 50 can be measured to determine if the shank portion 30 is fully inserted into the handle portion 50. Finally, the hole 12 provides a convenient place to attach a packaging card.

Next, the handle portion 50 will be described. Corresponding to the tapered shape of the shank portion 30 is a tapered slot 52 formed in the handle portion 50. Generally, the slot 52 will be the same size or slightly smaller than the shank portion 30 if the tapered end portion 30 had no projections 32, 38.

Figure 4:
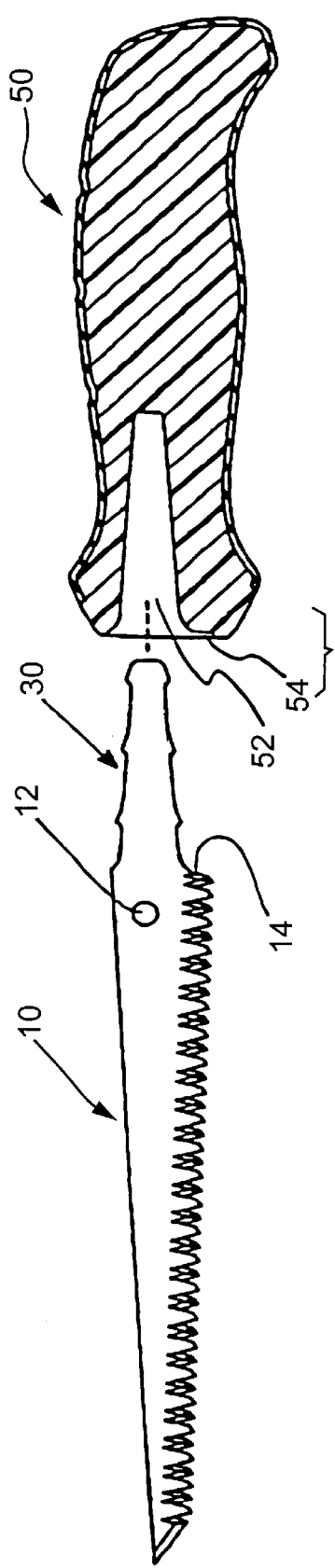
FIG. 4 is an exploded sectional view of the cutting device according to an embodiment of the present invention.
Figure 6:
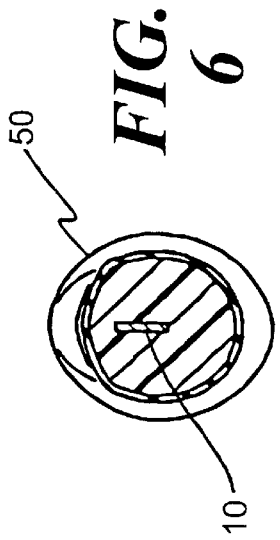
FIG. 6 is a sectional view taken along lines 6—6 in FIG. 5.
Figure 5:
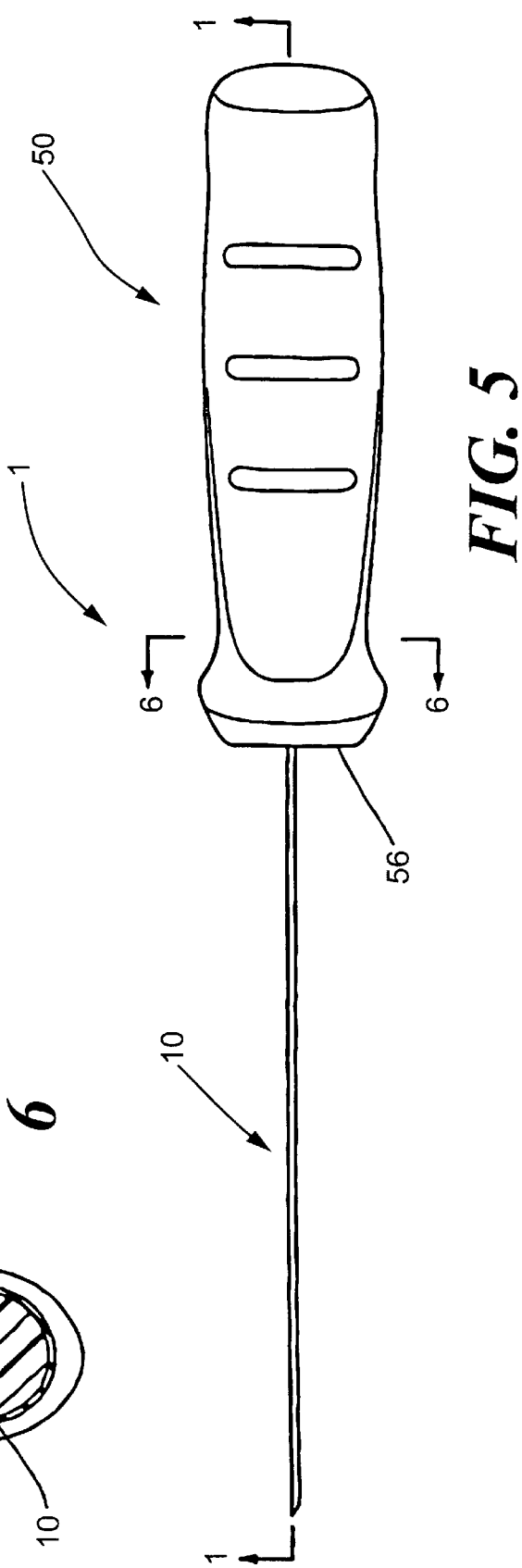
FIG. 5 is a top plan view of cutting device according to the present invention.

According to another embodiment of the present invention as shown in FIG. 4, the slot 52 in the handle 50 is provided with an enlarged forward opening 54. The enlarged forward opening 54 is configured and positioned to accommodate a back end 14 of the series of teeth 22 of the cutting blade 10 so that the rearward-most tooth 14 is at least partially disposed in the enlarged forward opening 54. The enlarged forward opening 54 is advantageous in that it permits generous part and assembly tolerances. Additionally, with the enlarged opening 54, the cutting blade 10 does not bottom out on the forwardly facing surface 56 of the handle portion 50. Accordingly, the enlarged opening 54 is a convenient way to remove an undesirable gap between the back end of the series of teeth 22 and the forwardly facing surface 56 of the handle portion 50. The presence of a gap in this location affects the perceived quality of the saw. The enlarged forward opening 54 therefore enhances the perceived quality of the saw by hiding any such gap.

Assembly of the cutting device 10 according to an embodiment of the present invention will now be described.

To assemble a saw according to an embodiment of the present invention, a fixing element 16 such as a hardened steel pin, or other fixing means is inserted into a hole 12 formed in the cutting blade 10 to securely hold the cutting blade. Having the cutting blade 10 securely held, the shank portion 30 of the cutting blade 10 is simply pressed into the slot 52 of the handle portion 50. Since the cutting blade 10 is fixed, this motion is effected by moving the handle portion 50 in the direction shown by the arrow in FIG. 9. As the shank portion 30 is pressed in the slot 52, a back end of the toothed portion 20 of the cutting blade 10 is pressed into the enlarged opening 54 rearwardly of the forwardly facing surface 56 such that a rearward-most tooth 14 of the cutting blade 10 is recessed past the forwardly facing surface of the handle portion 50.

Figure 7:
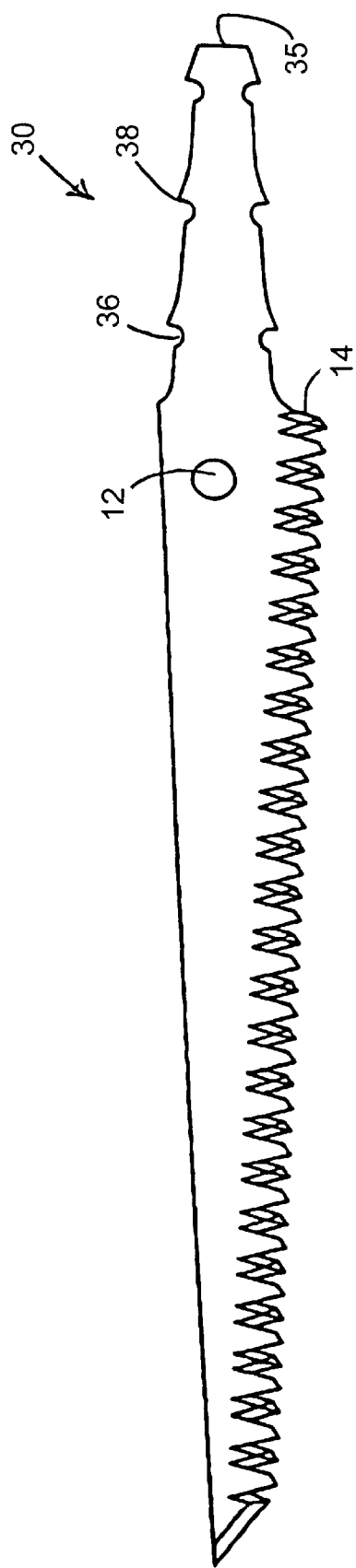
FIG. 7 is a side elevational view of a cutting blade according to another embodiment of the present invention.
Figure 8:
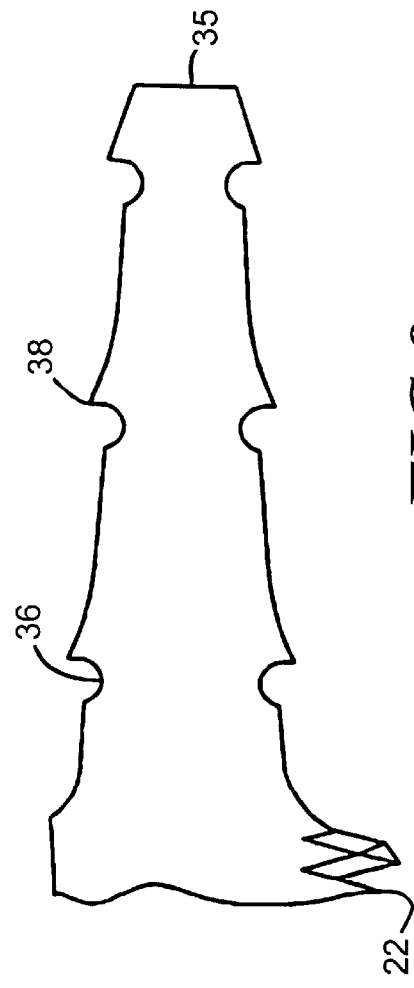
FIG. 8 is an enlarged view of the tang of the cutting blade shown in FIG. 7.

As the shank portion 30 is moved into the slot 52, each of the projections 32 displace a particular associated portion of plastic material lining the slot 52, which portion is not displaced by another of the projections 32. In FIG. 3, for example, there are three projections $A_1$, $B_1$, and $C_1$ shown. Each of these projections will displace (but perferably not cut) an associated region of plastic material A, B, and C, respectively, in the handle portion 50. As the plastic material is disturbed by the motion of the shank portion 30 into the slot 52, the plastic material displaces into the recessed area 33 formed immediately forwardly of the projections 32, as shown in FIG. 3. Projection $C_1$ displaces the plastic material in region C, and not the plastic material in regions A or B. Projection $B_1$ displaces the plastic material in region B, but not in regions A or C. Similarly, projection $A_1$ displaces the plastic material in region A, and not regions B or C. The plastic material is not cut by this movement, instead the plastic material resiliently moves into the recess 33. It can be appreciated that the same principles apply to the embodiment illustrated in FIGS. 7, 8 and 11, as the plastic material moves into the recesses 36.

Thereafter, the cutting device 1 may be inspected to determine if the cutting blade 10 is fully inserted into the handle portion 50. This inspection is performed by examining the positioning of the hole 12 forwardly of the forwardly facing surface 56 of the handle portion 50. Specifically, the inspection is conducted by measuring the distance from the hole 12 to the forwardly facing surface 56 of the handle portion 50 and comparing the measured value to a known value.

The foregoing detailed description of the preferred embodiments of this invention has been provided for the purposes of illustration and description. It is not intended to be exhaustive or to limit the invention to the precise embodiments disclosed. Other modifications and variations within the sprit and scope of the invention may be evident to the practitioners in the art when considered in reference to this disclosure.

I claim:

1. A device for cutting, comprising:
   a cutting blade formed of metal and having a forwardly disposed toothed portion and a rearwardly disposed shank portion terminating in a rearward end surface, said shank portion being tapered in shape and having outwardly extending projections terminating at associated end portions, said projections being spaced along a longitudinal axis of the cutting blade, and said end portions having increasing distances from said longitudinal axis as the associated projections are disposed further away from the end surface of said shank portion; and
   a handle portion formed of plastic material and having a tapered slot defined therein for accommodating said shank portion of said cutting blade such that said projections are fixedly secured within said handle portion.

2. The device according to claim 1, wherein said projections are pointed.

3. The device according to claim 2, wherein said shank portion comprises recesses at positions immediately forwardly of said projections for receiving plastic material which is displaced by said projections when said shank portion of said cutting blade is inserted into said slot defined in said handle portion.

4. The device according to claim 3, wherein the recess terminates along a line tangential to edges of the shank portion.

5. The device according to claim 1, wherein pairs of said projections are arranged opposite to each other along the longitudinal axis of said shank portion.

6. The device according to claim 5, wherein the pairs of said projections includes three pairs.

7. The device according to claim 1, wherein said projections are evenly spaced along the longitudinal axis of said cutting blade.

8. The device according to claim 1, wherein said cutting blade is formed from a high carbon steel material.

9. The device according to claim 1, wherein said handle portion is formed from a polypropylene material.

10. The device according to claim 9, wherein the handle portion includes a polypropylene core and a thermoplastic resin (TPR) cover.

11. The device according to claim 1, wherein said shank portion of said cutting blade is fixedly disposed in said handle portion such that said shank portion will remain attached to said handle portion under a tensile force of at least 450 pounds.

12. The device according to claim 1, wherein a hole is formed in said toothed portion of said cutting blade which is disposed forwardly of said handle portion.

13. A device for cutting, comprising:
    a cutting blade formed of metal and having a forwardly disposed toothed portion and a rearwardly disposed tapered shank portion terminating in a rearward end surface, wherein a hole is formed in said cutting blade portion; and
    a handle portion formed of plastic material and provided with a tapered slot defined therein for accommodating said tapered shank portion of said cutting blade to a predetermined depth therein, such that the hole remains forwardly disposed from said handle portion.

14. The device according to claim 13, wherein said shank portion includes outwardly extending projections terminating in associated end portions, said projections being spaced along a longitudinal axis of said cutting blade, and said end portions thereof having increasing distances from said longitudinal axis as the associated projections are disposed further away from the end surface of said shank portion.

15. The device according to claim 13, wherein the hole is formed generally along the toothed portion of said cutting blade.

16. The device for cutting according to claim 15, wherein the hole formed in the toothed portion of the cutting blade has a diameter of approximately 3/16 inches.

17. A device for cutting, comprising:
    a cutting blade formed of metal and having a forwardly disposed toothed portion and a rearwardly disposed tapered shank portion; and
    a handle portion formed of plastic material and provided with a tapered slot defined therein for accommodating said tapered shank portion of said cutting blade such that said cutting blade can be attached to said handle, said handle portion having a forwardly facing surface surrounding said slot, said slot having an enlarged forward opening, said slot being configured and positioned to accommodate said toothed portion of said cutting blade such that at least a portion of a rearwardmost tooth is disposed in said enlarged forward opening and rearwardly of said forwardly facing surface.

18. A tool, comprising:
a working member formed of metal and having a forwardly disposed work portion and a rearwardly disposed shank portion terminating in a rearward end surface, said shank portion being tapered in shape and having outwardly extending projections terminating at associated end portions, said projections being spaced along a longitudinal axis of the member, and said end portions having increasing distances from said longitudinal axis as the associated projections are disposed further away from the end surface of said shank portion; and
a handle portion formed of plastic material and having a tapered slot defined therein for accommodating said shank portion of said working member such that said projections are fixedly secured within said handle portion.

19. A tool according to claim 18, wherein said projections are pointed.

20. A tool according to claim 19, wherein said shank portion comprises recesses at positions immediately forwardly of said projections for receiving plastic material which is displaced by said projections when said shank portion of said member is inserted into said slot defined in said handle portion.

21. A tool according to claim 20, wherein the recess terminates along a line tangential to edges of the shank portion.

22. A tool according to claim 18, wherein pairs of said projections are arranged opposite to each other along the longitudinal axis of said shank portion.

23. A tool according to claim 22, wherein the pairs of said projections includes three pairs.

24. A tool according to claim 18, wherein said projections are evenly spaced along the longitudinal axis of said working member.

25. A tool according to claim 18, wherein said member is formed from a high carbon steel material.

26. A tool according to claim 18, wherein said handle portion is formed from a polypropylene material.

27. A tool according to claim 26, wherein the handle portion includes a polypropylene core and a thermoplastic resin (TPR) cover.

28. A tool according to claim 18, wherein said shank portion of said working member is fixedly disposed in said handle portion such that said shank portion will remain attached to said handle portion under a tensile force of at least 450 pounds.

29. A tool according to claim 18, wherein a hole is formed in said work portion of said working member which is disposed forwardly of said handle portion.

30. A tool according to claim 18, wherein said tool is a saw and said forwardly disposed work portion comprises saw teeth.

31. A tool, comprising:
a working member formed of metal and having a forwardly disposed work portion and a rearwardly disposed tapered shank portion terminating in a rearward end surface, wherein a hole is formed in said forwardly disposed work portion; and
a handle portion formed of plastic material and provided with a tapered slot defined therein for accommodating said tapered shank portion of said working member to a predetermined depth therein, such that the hole remains forwardly disposed from said handle portion.

32. The tool according to claim 31, wherein said shank portion includes outwardly extending projections terminating in associated end portions, said projections being spaced along a longitudinal axis of said working member, and said end portions thereof having increasing distances from said longitudinal axis as the associated projections are disposed further away from the end surface of said shank portion.

33. The tool according to claim 31, wherein the hole is formed generally along the work portion of said working member.

34. The tool according to claim 33, wherein the hole formed in the work portion of the working member has a diameter of approximately 3/16 inches.

35. A tool comprising:
a working member formed of metal and having a forwardly disposed work portion and a rearwardly disposed tapered shank portion terminating in a rearward end surface, wherein a hole is formed in said forwardly disposed work portion; and
a handle portion formed of plastic material and provided with a tapered slot defined therein for accommodating said tapered shank portion of said working member to a predetermined depth therein, such that the hole remains forwardly disposed from said handle portion, wherein said tool is a saw and said forwardly disposed work portion comprises saw teeth.

36. A tool, comprising:
a working member formed of metal and having a forwardly disposed work portion and a rearwardly disposed tapered shank portion; and
a handle portion formed of plastic material and provided with a tapered slot defined therein for accommodating said tapered shank portion of said working member such that said working member can be attached to said handle, said handle portion having a forwardly facing surface surrounding said slot, said slot having an enlarged forward opening, said slot being configured and positioned to accommodate said work portion of said working member such that at least a portion of the work portion is disposed in said enlarged forward opening and rearwardly of said forwardly facing surface.

37. A tool, comprising:
a working member formed of metal;
a handle portion formed of plastic material and having a tapered slot defined therein;
a connecting portion having plural outwardly extending projections terminating at associated end portions, said projections being spaced along a longitudinal axis of the member, said end portions having increasing distances from said longitudinal axis as the associated projections approach an end of the connecting portion, said connecting portion having said end portions thereof disposed in retaining contact with the plastic material within said slot.

* * * * *